July 19, 1955 J. C. DRISKELL 2,713,536
PRODUCTION OF NITROGEN-PHOSPHORUS COMPOUNDS
Filed Jan. 7, 1955
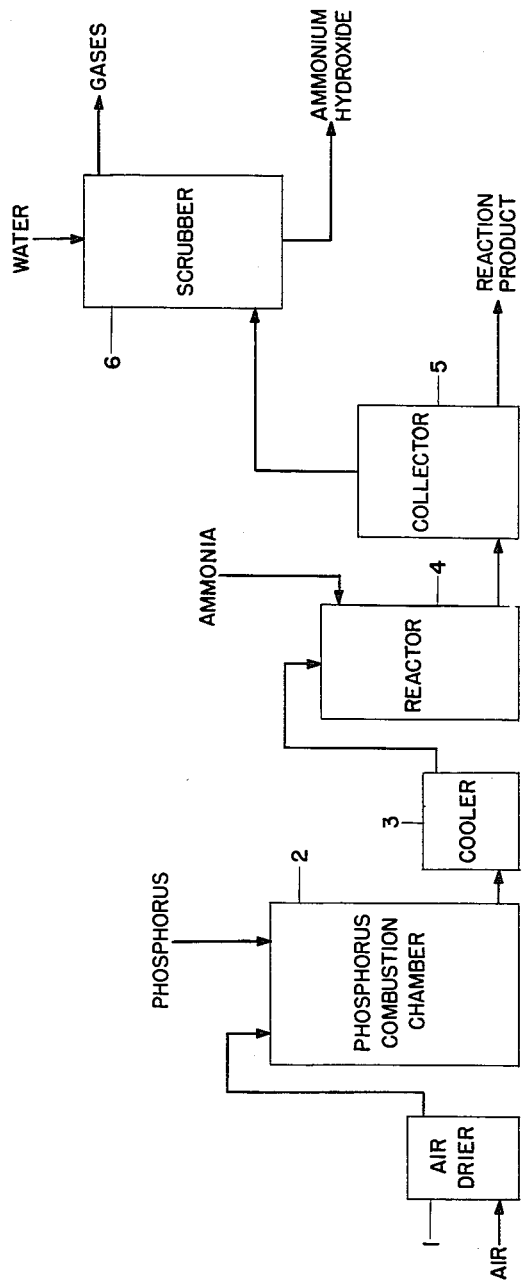
JOHN C. DRISKELL INVENTOR.
BY
ATTORNEY

United States Patent Office 2,713,536
Patented July 19, 1955

2,713,536
PRODUCTION OF NITROGEN-PHOSPHORUS COMPOUNDS

John C. Driskell, Sheffield, Ala., assignor to Tennessee Valley Authority, a corporation of the United States Application January 7, 1955, Serial No. 480,625

6 Claims. (Cl. 71—49)

(Granted under Title 35, U. S. Code (1952), sec. 266)

The invention herein described may be manufactured and used by or for the Government for governmental purposes without payment to me of any royalty thereon.

This invention relates to the production of a mixture of compounds containing nitrogen and phosphorus. It relates in particular to the production of such a mixture from phosphorus, dry air, and ammonia.

The action of ammonia on phosphorus pentoxide has been studied by a number of investigators, beginning with the work of Schiff [Liebig's Ann. 103, 168 (1857)]. Sanfourche et al. [Bull. Soc. Chim. 47, No. 4, 273–9 (1930)], in a paper describing their own studies, reviewed the work of previous investigators. In the small-scale work by Sanfourche et al., red phosphorus was burned with a mixture of air and nitrogen, ammonia was added to the combustion products, and the reaction product was collected in jars. These workers investigated the effect of the amount of moisture in the combustion air and found that they obtained low yields of product when they used artificially dried air. They postulated their reaction to be

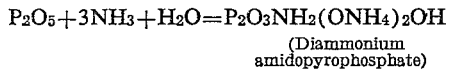
(Diammonium amidopyrophosphate)

Methods for preparing ammonium metaphosphate from phosphorus, air, water, and ammonia also have been proposed. Among the methods proposed are those described by Ross et al., U. S. Patent 1,194,077, and by Rice, U. S. Patents 2,561,415 and 2,689,780.

According to these methods, phosphorus is burned with air containing moisture, and the resulting phosphorus pentoxide is reacted with ammonia. The product of this reaction is collected as a white, fluffy powder. The following reaction is presumed to take place:

If the air used to burn the phosphorus contains insufficient water to satisfy the requirement for the reaction, additional water is added to the system.

Woodstock, in U. S. Patent 2,122,122, describes a process in which ammonia is reacted with solid phosphorus pentoxide.

There are several drawbacks to the prior methods for reacting ammonia with phosphorus pentoxide. Those processes in which solid phosphorus pentoxide is employed necessarily involve the different and costly preparation of solid phosphorus pentoxide. The processes in which phosphorus is burned with air containing water vapor have the disadvantage that a poor recovery of phosphorus is obtained. One reason for the poor phosphorus recovery is that water vapor in the combustion air reacts with phosphorus pentoxide to form metaphosphoric acid. This acid collects in the phosphorus combustion chamber in the form of a highly viscous, glassy material. Not only does formation of this acid constitute a loss of phosphorus to the process, but it gives rise to a difficult problem of removing it from the combustion chamber.

It is an object of this invention to provide a new process for reacting ammonia with phosphorus pentoxide.

Another object is to provide a process in which the difficulties of prior processes are avoided.

Still another object is to produce a new composition of matter consisting of a mixture of compounds containing phosphorus and nitrogen.

Other objects and advantages of my invention will become apparent as this disclosure proceeds.

I have discovered a process which comprises the steps of drying air to a moisture content of less than about 0.00008 pound water per pound of dry air; oxidizing elemental phosphorus with the dried air; cooling the products of combustion to a temperature of 450° to 950° F., preferably 550° to 700° F.; reacting the phosphorus pentoxide vapor in the cooled combustion gases with ammonia in a proportion of from 2.1 to 2.7 moles of $NH_3$ to 1.0 mole of $P_2O_5$; and collecting the solid, finely divided product of said reaction.

The product of this reaction is a new composition of matter consisting of an intimate mixture of ammonium metaphosphate, phosphoronitridic acid, and ammonium phosphoronitridate. The mixture contains nitrogen and phosphorus in an atomic ratio of 1.05 to 1.35 with from 60 to 75 percent of its nitrogen in ammoniacal form. In this mixture, the ammonium metaphosphate content ranges from 60 to 79 percent, the phosphoronitridic acid content ranges from 1.5 to 19.0 percent, and the ammonium phosphoronitridate content ranges from 10 to 30 percent.

The single figure attached is a flow diagram illustrating a process utilizing principles of my invention. As shown, air is passed through air drier 1 for the purpose of reducing the moisture content of the air to the lowest practical amount, preferably less than about 0.00008 pound per pound of dry air. Dry air and elemental phosphorus are introduced into phosphorus combustion chamber 2, where the phosphorus is oxidized to phosphorus pentoxide. The gases are cooled to a temperature of 450° to 950° F., preferably 550° to 700° F., in cooler 3 and are introduced into reactor 4, into which anhydrous ammonia also is introduced. The ammonia and the phosphorus pentoxide react to form a dry, white, fluffy powder, which is collected in collector 5. Gases vented from collector 5 are passed through scrubber 6, wherein unreacted ammonia is recovered by absorbing it in water. The ammonia may, if desired, be separated from the water by treatment with steam. The ammonia may then be recycled to the process.

Equipment for drying air is available commercially. With a silica gel absorption system, for example, air may be dried to a dew point as low as —94° F. (0.0000016 pound water per pound dry air). With anhydrous calcium sulfate, dew points down to —80° F. (0.0000049 pound water per pound dry air) may be obtained. It is desirable to have the air as dry as possible. A dew point below about —40° F. is satisfactory. This dew point corresponds to an absolute humidity of about 0.00008 pound water per pound of dry air.

The phosphorus may be introduced into the combustion chamber 2 either as a liquid or as a vapor. The combustion chamber may be of a type conventionally used in the manufacture of phosphoric acid from elemental phosphorus. For example, a vertically disposed chamber constructed of graphite blocks may be employed.

A special cooler 3 may or may not be needed, depending largely on the scale of the manufacturing operation. All that is necessary is that the gases be cooled to a temperature of 450° to 950° F. before they are contacted with ammonia. Preferably, the gases are cooled to 550° to 700° F. In a relatively small-scale operation loss of heat from the combustion chamber may be sufficient to permit attainment of temperatures within this range. On a large scale, however, it may be necessary to provide a separate cooler. In commercial-size phosphoric acid plants, for example, the temperature of gases leaving the combustion chamber may run as high as about 1400° F. A water-cooled heat exchanger constructed of impervious graphite may be used as the cooler.

The reaction chamber 4 preferably is constructed of stainless steel. Ammonia may be introduced at one or more points, provided that the temperature at the point of introduction is between 450° and 950° F.

Equipment for collection of the reaction product should be of a type suitable for recovering finely divided solids from gases. An electrostatic precipitator or a bag filter is suitable for this purpose.

The product obtained in my process consists essentially of a mixture of ammonium metaphosphate, $NH_4PO_3$, phosphoronitridic acid $(OH)_2PN$, and ammonium phosphoronitridate, $NH_4OOHPN$. These compounds result from a combination of several chemical reactions. Phosphoronitridic acid is formed according to the reaction $$P_2O_5 + 2NH_3 \rightarrow 2(OH)_2PN + H_2O$$

The mole of water produced in this reaction reacts with one of the two moles of phosphoronitridic acid to form ammonium metaphosphate $$(OH)_2PN + H_2O \rightarrow NH_4PO_3$$

Formation of ammonium phosphoronitridate may be represented by the reaction $$(OH)_2PN + NH_3 \rightarrow NH_4OOHPN$$

Any water that is introduced into the system with the reactants, particularly the air and the phosphorus, is free to react with phosphoronitridic acid and ammonium phosphoronitridate according to the reactions $$(OH)_2PN + H_2O \rightarrow NH_4PO_3$$

and $$NH_4OOHPN + H_2O \rightarrow NH_4PO_3 + NH_3$$

The overall reaction between ammonia and phosphorus pentoxide, assuming that no water is added to the system, may be represented as follows:

$$XNH_3 + P_2O_5 \rightarrow (X-2)NH_4OOHPN + (3-X)(OH)_2PN + NH_4PO_3$$

where X is a number between 2 and 3. Materials produced in studies of my process have atomic ratios of N to P ranging from about 1.05 to about 1.35. These ratios correspond to values for X ranging from 2.1 to 2.7. With X equal to 2.3, for example, the product theoretically would contain 15.9 percent $NH_4OOHPN$, 30.5 percent $(OH)_2PN$, and 53.6 percent $NH_4PO_3$. The theoretical ratio of ammoniacal nitrogen to total nitrogen would be 0.565. However, because it is impossible to avoid the addition of some water with the reactants, the actual composition of the product differs from the theoretical. An actual product produced in a pilot plant contained 17.6 percent N and 33.9 percent P, and had an atomic ratio of N to P of 1.15 (X=2.3). The ratio of ammoniacal to total nitrogen in this product, however, was 0.73, as compared to the theoretical ratio of 0.565. The product, therefore, contained a larger proportion of ammonium metaphosphate and lesser proportions of phosphoronitridic acid and ammonium phosphoronitridate than is indicated by the theoretical composition. Calculations based on the nitrogen content and the ratio of ammoniacal to total nitrogen indicate that the actual contents of ammonium metaphosphate, phosphoronitridic acid, and ammonium phosphoronitridate were about 69.5 percent, 11.5 percent, and 19.0 percent, respectively. A material consisting only of these three components in the calculated proportions would contain 32.9 percent P. The chemical analysis of the product, however, showed a phosphorus content of 33.9 percent. This slight discrepancy would indicate that there was a small amount of some other material present in the product, or that the analysis was not precisely correct.

The following table gives analyses of a number of samples produced in studies of my process and the calculated proportions of ammonium metaphosphate, phosphoronitridic acid, and ammonium phosphoronitridate in those samples.

| \multicolumn{5}{c}{Analysis} | | Calculated composition | | |
|---|---|---|---|---|---|---|---|
| P | Total N | Ammoniacal N | Atomic ratio, N:P | Ratio, ammoniacal N:total N | $NH_4PO_3$ | $(OH)_2PN$ | $NH_4OOHPN$ |
| 33.5 | 17.9 | 11.7 | 1.18 | 0.65 | 61.3 | 19.0 | 19.7 |
| 32.5 | 18.3 | 12.0 | 1.25 | .66 | 60.3 | 17.0 | 22.7 |
| 34.0 | 17.4 | 14.2 | 1.13 | .82 | 78.5 | 1.5 | 20.0 |
| 33.0 | 18.8 | 14.2 | 1.26 | .76 | 68.8 | 1.5 | 29.7 |
| 34.1 | 16.6 | 13.0 | 1.08 | .78 | 77.3 | 9.8 | 12.9 |
| 33.2 | 16.4 | 12.1 | 1.09 | .74 | 73.8 | 16.0 | 10.2 |

The product obtained in my process is a fluffy white powder of low bulk density. It is not readily soluble in water and is hygroscopic.

This product, being high in nitrogen and phosphorus, holds promise as a fertilizer material. Plant-growth tests have indicated that it is at least equal to ammonium nitrate as a source of nitrogen, and to superphosphate as a source of phosphorus.

The product is also useful as an intermediate in the preparation of other nitrogen-phosphorus materials. For example, water-softening compounds and fire retardants may be made from it.

Tests of my process were carried out both in laboratory apparatus and in a pilot plant. Pilot-plant equipment for the production of intermediate products included water-displacement tanks for metering molten phosphorus, a phosphorus vaporizer, a silica gel air drier, a phosphorus combustion chamber, an ammonia-phosphorus pentoxide reaction chamber, and an electrostatic precipitator for collecting the product.

*Example*

In a typical pilot-plant run the process was carried out as follows:

Molten elemental phosphorus was metered to the phosphorus vaporizer at a rate of 6.2 pounds per hour. Air at a rate of 35 cubic feet per minute (at normal temperature and pressure) was passed through the silica gel drier. The amount of air was 260 percent of that required to oxidize the phosphorus to phosphorus pentoxide. The dew point of the air from the drier was minus 80° F. (0.0000049 pound water per pound dry air).

The phosphorus vapor was burned with the dried air in the combustion chamber. In passing from the combustion chamber to the reaction chamber, the gases were cooled to a temperature of 580° F. Ammonia vapor was introduced into the reaction chamber at a rate of 5.4 pounds per hour. The mole ratio of $NH_3$ introduced to $P_2O_5$ introduced was 3.2. The temperature in the reaction zone was 60° F.

The solid product produced in this reaction was collected in the electrostatic precipitator. Excess ammonia present in the offgases was not recovered in these tests. It could, however, have been recovered simply by scrubbing the gases with water.

The intermediate product collected in the electrostatic precipitator had a phosphorus content of 33.9 percent and a total nitrogen content of 17.5 percent. The ammoniacal nitrogen content was 12.8 per cent, or 73 percent of the total nitrogen. The product was a fluffy white powder; its bulk density was about 15 pounds per cubic foot.

In this test, in which a total of 32 pounds of phosphorus was burned, only a negligible amount of glassy metaphosphoric acid accumulated in the combustion chamber, and none was found in the reaction chamber.

In another test, in which 22 pounds of phosphorus was burned with undried air, approximately 6.5 pounds of metaphosphoric acid accumulated in the combustion chamber. This illustrates the advantage of using dried air, which is an essential feature of my invention.

I claim as my invention:

1. The process which comprises the steps of drying air to a moisture content of less than 0.00008 pound water per pound dry air; oxidizing elemental phosphorus with the dry air; cooling the products of combustion to a temperature of 450° to 950° F.; reacting the phosphorus pentoxide vapor in the cooled combustion products with anhydrous ammonia; and collecting the solid, finely divided product of said reaction.

2. The process of claim 1 in which the proportion of ammonia reacted with phosphorus pentoxide is within the range of 2.1 to 2.7 moles $NH_3$ per mole of $P_2O_5$.

3. The process of claim 1 wherein the products of combustion are cooled to a temperature in the range from 550° to 700° F. prior to reaction with anhydrous ammonia.

4. The process of claim 1 wherein the products of reaction are cooled to a temperature in the range from 550° to 700° F. and the phosphorus pentoxide therein is reacted with from 2.1 to 2.7 moles of ammonia per mole of phosphorus pentoxide.

5. A new composition of matter consisting essentially of an intimate mixture of ammonium metaphosphate, phosphoronitridic acid, and ammonium phosphoronitridate, said mixture having an atomic ratio of nitrogen to phosphorus of 1.05 to 1.35 and containing from 60 to 75 percent of its nitrogen in ammoniacal form.

6. A new composition of matter consisting of an intimate mixture of 60 to 79 parts of ammonium metaphosphate, 1.5 to 19.0 parts of phosphoronitridic acid, and 10 to 30 parts of ammonium phosphoronitridate.

References Cited in the file of this patent

UNITED STATES PATENTS

| | | |
|---|---|---|
| 2,561,415 | Rice | July 24, 1951 |
| 2,689,780 | Rice | Sept. 24, 1954 |